US 6,904,168 B1

(12) United States Patent
Steinberg et al.

(10) Patent No.: US 6,904,168 B1
(45) Date of Patent: Jun. 7, 2005

(54) WORKFLOW SYSTEM FOR DETECTION AND CLASSIFICATION OF IMAGES SUSPECTED AS PORNOGRAPHIC

(75) Inventors: Eran Steinberg, San Francisco, CA (US); Petronel Bigioi, Galway (IE); Ilariu Raducan, Galway (IE)

(73) Assignee: Fotonation Holdings, LLC, Peterborough, NH (US)

( * ) Notice: Subject to any disclaimer, the term of this patent is extended or adjusted under 35 U.S.C. 154(b) by 659 days.

(21) Appl. No.: 10/040,901

(22) Filed: Oct. 22, 2001

Related U.S. Application Data

(63) Continuation-in-part of application No. 09/823,139, filed on Mar. 29, 2001, now Pat. No. 6,751,348.

(51) Int. Cl.$^7$ .............................................. G06K 9/00
(52) U.S. Cl. ...................................... 382/165; 382/100
(58) Field of Search ................................. 382/100, 162, 382/165, 181, 189, 203, 224, 225, 266, 305; 709/217–219, 224–225, 229, 232

(56) References Cited

U.S. PATENT DOCUMENTS

| | | | |
|---|---|---|---|
| 5,177,694 A | 1/1993 | Graham et al. | 364/526 |
| 5,218,555 A | 6/1993 | Komai et al. | 364/526 |
| 5,329,596 A | 7/1994 | Sakou et al. | 382/37 |
| 5,488,429 A | 1/1996 | Kojima et al. | 348/653 |
| 5,633,952 A | 5/1997 | Outa et al. | 382/165 |
| 5,638,136 A | 6/1997 | Kojima et al. | 348/653 |
| 5,668,897 A | 9/1997 | Stoflo | 395/609 |
| 5,678,041 A | 10/1997 | Baker et al. | 395/609 |
| 5,754,676 A | 5/1998 | Komiya et al. | 382/132 |
| 5,765,029 A | 6/1998 | Schweid et al. | 395/61 |
| 5,771,307 A | 6/1998 | Lu et al. | 382/116 |
| 5,778,156 A | 7/1998 | Schhweid et al. | 396/61 |
| 5,784,564 A | 7/1998 | Camaisa et al. | 709/224 |
| 5,796,869 A | 8/1998 | Tsuji et al. | 382/203 |
| 5,805,730 A | 9/1998 | Yaeger et al. | 382/228 |

(Continued)

FOREIGN PATENT DOCUMENTS

| | | | | |
|---|---|---|---|---|
| GB | 1/126508 | | 8/2001 | H01L/21/00 |
| JP | 09237348 A | | 9/1997 | G06T/7/60 |
| WO | WO00/67204 | | 11/2000 | G06M/7/00 |

OTHER PUBLICATIONS

Forsyth, David A. et al., "Finding Naked People," Journal Review, 1996.
Forsyth, David A. et al., "Finding Pictures of Objects in Large Collections of Images," Proceedings, International Workshop on Object Recognition, Cambridge, 1996.
Flich, Margaret, et al., "Finding Naked People," Proceedings of 4$^{th}$ European Conference on Computer Vision, 1996.

*Primary Examiner*—Andrew W. Johns
*Assistant Examiner*—Amir Alavi
(74) *Attorney, Agent, or Firm*—Sawyer Law Group LLP (57) ABSTRACT

An enterprise based workflow server based system to detect and classify images as potentially of pornographic nature. The system is based on two independent stages. The first stage is an automatic stage which eliminates most images that are positively non pornographic, including an image analysis engine with a plurality of sub engines, each dedicated to different attributes of an image. The second stage describes an additional embodiment of a manual review stage. An alternative embodiment describes a similar server solution to detect images suspected as copyrighted material. The images can be individually classified, or analyzed as a cluster or a collection of images such as an album or motion-picture segment, sampled into key still frames. The system optimizes time saving by elimination of images, and assures accuracy by generating a workflow reviewing solution which can involve a human decision-making stage.

38 Claims, 8 Drawing Sheets

U.S. PATENT DOCUMENTS

| | | | |
|---|---|---|---|
| 5,813,542 A | 9/1998 | Cohn | 209/581 |
| 5,828,779 A | 10/1998 | Maggioni | 382/165 |
| 5,832,212 A | 11/1998 | Cragun et al. | 395/188.01 |
| 5,835,722 A | 11/1998 | Bradshaw et al. | 395/200.55 |
| 5,852,823 A | 12/1998 | De Bonet | 707/6 |
| RE36,041 E | 1/1999 | Turk et al. | 382/118 |
| 5,857,014 A | 1/1999 | Sumner et al. | 379/93.02 |
| 5,872,859 A | 2/1999 | Gur et al. | 382/128 |
| 5,911,043 A | 6/1999 | Duffy et al. | 395/200.33 |
| 5,937,404 A | 8/1999 | Csaszar et al. | 707/9 |
| 5,949,904 A | 9/1999 | Delp | 382/165 |
| 5,987,611 A * | 11/1999 | Freund | 713/201 |
| 6,041,133 A | 3/2000 | Califano et al. | 382/124 |
| 6,049,821 A | 4/2000 | Theriault et al. | 709/203 |
| 6,052,709 A * | 4/2000 | Paul | 709/202 |
| 6,065,055 A | 5/2000 | Hughes et al. | 709/203 |
| 6,065,056 A | 5/2000 | Bradshaw et al. | 709/229 |
| 6,067,399 A | 5/2000 | Berger | 386/46 |
| 6,115,495 A | 9/2000 | Tachikawa et al. | 382/165 |
| 6,122,400 A | 9/2000 | Reitmeier | 382/166 |
| 6,128,397 A | 10/2000 | Baluja et al. | 382/118 |
| 6,148,092 A | 11/2000 | Qian | 382/118 |
| 6,161,130 A * | 12/2000 | Horvitz et al. | 709/206 |
| 6,182,081 B1 | 1/2001 | Dietl et al. | 707/102 |
| 6,259,801 B1 | 7/2001 | Wakasu | 382/100 |
| 6,266,664 B1 * | 7/2001 | Russell-Falla et al. | 707/5 |
| 6,286,001 B1 | 9/2001 | Walker et al. | 707/9 |
| 6,345,283 B1 * | 2/2002 | Anderson | 707/205 |
| 6,389,472 B1 * | 5/2002 | Hughes et al. | 709/229 |
| 6,407,777 B1 | 6/2002 | Deluca | 348/576 |
| 6,442,606 B1 * | 8/2002 | Subbaroyan et al. | 709/224 |
| 6,446,119 B1 * | 9/2002 | Olah et al. | 709/224 |
| 6,650,777 B1 * | 11/2003 | Jensen et al. | 382/203 |
| 6,757,661 B1 * | 6/2004 | Blaser et al. | 705/14 |
| 6,779,021 B1 * | 8/2004 | Bates et al. | 709/206 |
| 2001/0002931 A1 | 6/2001 | Maes | 382/100 |
| 2002/0126893 A1 | 9/2002 | Held et al. | 382/167 |
| 2002/0136450 A1 | 9/2002 | Chen et al. | 382/165 |

\* cited by examiner

WORKFLOW SYSTEM FOR DETECTION AND CLASSIFICATION OF IMAGES SUSPECTED AS PORNOGRAPHIC

This application is a continuation-in-part of Ser. No. 09/823,139 Filed Mar. 29th, 2001 now U.S. Pat. No. 6,751,348, titled Automated Detection of Pornographic Images.

BACKGROUND OF THE INVENTION

1. Field of the Invention

This invention relates generally to the field of workflow based image analysis and classification and more particularly to a classification of images suspected as pornographic in nature or images suspected as being of a copyright nature.

2. Description of Prior Art

A variety of methods have been used in an attempt to detect and categorize objectionable images. Pornographic-free web sites, such as sites targeting families and children have been set up for shielding children from viewing objectionable material. Although a particular site may be pornographic free, and considered acceptable for access by children, it is still possible to gain access to an objectionable web site by starting from an acceptable site. Software applications and Internet services such as Net-Nanny and Cyber-Sitter were created and marketed to help parents prevent their children from accessing objectionable documents by blocking access to specific web sites.

One type of protective software is designed to store the addresses of objectionable web sites, and block access to these sites. Example of prior art are U.S. Pat. No. 5,678,041 to Baker and Grosse, U.S. Pat. No. 6,049,821 to Theriault et. al., and U.S. Pat. No. 6,065,055 to Hughes and Elswick.

Another form of software protection screens the text information accessed by a computer from the network and blocks information sources that are considered objectionable. Examples of such prior art include U.S. Pat. No. 5,832,212 to Cragun & Day, U.S. Pat. No. 5,835,722 to Bradshaw and Shih, U.S. Pat. No. 5,996,011 to Humes, U.S. Pat. No. 6,065,056 to Bradshaw and Shih, and U.S. Pat. No. 6,266,664 to Russell-Falla & Hanson.

Such methods are prone to error as many words have subtle double-meanings which can easily be misinterpreted by such software and other words commonly used in everyday conversation can be easily taken out of context. Further, although such software does have a role to play in content management it does not address the fundamental issue of determining the nature of graphical content on large image collections such as Internet photo communities.

Yet another type of protective software blocks access to URLs except those that are members of a list of manually approved URLs. Examples of prior art include U.S. Pat. No. 5,784,564 to Camaisa et. al. and U.S. Pat. No. 6,286,001 to Walker & Webb.

These approaches are not highly effective because it is a practical impossibility to manually screen all of the images on all of the web sites that are added each day to the web. They rely on either storing a local database of website URLs, or referencing the database on the Internet.

Other approach such as described in U.S. Pat. No. 5,668,897 by Stoflo (Sep. 16, 1997), categorizes images based on a unique image signature into a database for later retrieval and comparison. Such solutions are limited by a known collection of images, which will always be a subset of images created.

Various image-processing algorithms have been investigated for use in detecting objectionable media. For example, algorithms have been tested for use in recognizing shapes, such as people in general, and specific body parts. A detailed summary of work done with algorithms is found in David A. Forsyth and Margaret Flich, Finding Naked People, Journal Reviewing, 1996 and Margaret Flich, David A. Forsyth, Chris Bregler, Finding Naked People, Proceedings of 4th European Conference on Computer Vision, 1996; and David A. Forsyth et al., Finding Pictures of Objects in Large Collections of Images, Proceedings, International Workshop on Object Recognition, Cambridge, 1996. However, all of the above describe individual approaches to analyzing single images using single criteria. None of these publications provide an algorithm/system even close to a robust system, which can be practically used.

Several patents in this field were granted. U.S. Pat. No. 6,148,092 to Qian et al. (Nov. 14, 2000) describes a method of detecting skin-tone and in particular detecting faces, using a luminance chrominance algorithm, which is limited to well defined and full bodies. U.S. Pat. No. 5,638,136 to Kojima et. al. (Jun. 7, 1997) describes yet another method of detecting flesh-tone, and again, this method is limited to well defined chrominance information.

In unrelated fields, Japan patent 09237348A to Hiroshi et. al (Sep. 9, 1997) describes a method of determining the posture of a body. Hiroshi et al. has limited usefulness being again, dependent on color segmentation of an image. U.S. Pat. No. 6,182,081 to Dietl et. al. describes a method for performing an interactive review of the data contents of a computer with a view to the manual screening of objectionable material contained thereon. However, this method is limited to screening text data against a list of objectionable words and collecting all image data in a thumbnail form for manual review. Thus it is not suitable for application to very large collections of images.

In order for an algorithm to be useful for screening objectionable images, it is necessary for the algorithm to achieve a very high ratio of the number of objectionable images correctly identified to the total number of objectionable images in a database. Unfortunately, no algorithm can determine with full accuracy if an image is of pornographic nature or simply an artistic nude, erotic image or an image with a large amount of skin tone but not of any offensive nature. PCT application of USA application WO00/67204 to Papazian et. al. describes the advantage of using a multiple selection of images to increase the overall likelihood, using the fact that the distribution of the likelihood of detection is spread in a Gaussain fashion and the variance is reduced as a function of the samples. However, Papazian et. al. are not utilizing the cross information that one can achieve from a collection of images, but merely using a statistical improvement.

Similarly in the field of copyright detection. The research work and patents applied all relate to different methods and techniques of watermarking images and then detecting watermarked images. Such techniques are described in EPO EP1/126408 to Wen et. al (22/08/2001) describing a method of detecting embedded information in images. U.S. Pat. No. 06,259,801 B1 to Wakasu (Jul. 10, 2001) describes watermarking and detecting of watermarked images using DCT methods. U.S. patent publication U.S.2001/0002931 A1 to Maes describes means of detecting images that were marked using geometrical shapes. The drawback in such an approach is that individual detection of watermarked images does not easily or practically lend itself to any form of automatic or workflow solution.

SUMMARY

The primary object of the invention is to provide a more accurate screening tool for suspected pornographic images.

A further object is to increase human body detection accuracy beyond skin-tone criteria.

Another object of the invention is to enable pornographic screening for synthetic images as well as black-and-white or graphic images.

Another object of the invention is to provide faster tools for searching for pornographic images.

A further object of the invention is to provide an enterprise software workflow solution to screen images.

Yet another object of the invention is to improve productivity by combining an automated process for large volume and a secondary manual process for the final decision-making.

Another object of the invention is to provide more efficient tools for searching and detecting copyrighted images.

Briefly, a preferred embodiment of the present invention includes an enterprise based workflow server based system to detect and classify images as potentially of pornographic nature. The system is based on two independent stages. The first stage is an automatic stage which eliminates most images that are positively non pornographic, including an image analysis engine with a plurality of sub engines, each dedicated to different attributes of an image. The second stage describes an additional embodiment of a manual review stage. An alternative embodiment describes a similar server solution to detect images suspected as copyrighted material. The images can be individually classified, or analyzed as a cluster or a collection of images such as an album or motion-picture segment, sampled into key still frames. The system optimizes time saving by elimination of images, and assures accuracy by generating a workflow reviewing solution which can involve a human decision-making stage.

An alternative embodiment describes utilizing the same system with different detection criteria to classify images suspected to be copyrighted.

An advantage of the present invention is that it provides a workflow solution to handle a review of a large amount of digital images.

A further advantage is that the workflow includes an automated step, which eliminates most images and a manual stage, which is of higher accuracy, while dealing with a smaller number of images.

A still further advantage of the present invention is that it provides a modular architecture that is scalable and adjustable based on the load and the load balancing needed.

Another advantage of the present invention is that the automatic classification module can be fine tuned or changed without changing the workflow.

A still further advantage of the method of the present invention is that web sites providing images to the public can block any display of inappropriate pornographic material.

Another advantage of the method of the present invention is that businesses that sell and license images can prevent unlawful usage of such images.

DETAILED DESCRIPTION OF THE PREFERRED EMBODIMENT

The method of the present invention applies to the detection of pornographic images transmitted over a communications network, and includes single or still images, motion-picture segments and collections of images such as albums. Alternatively, the system can detect images of copyrighted nature.

Figure 1:
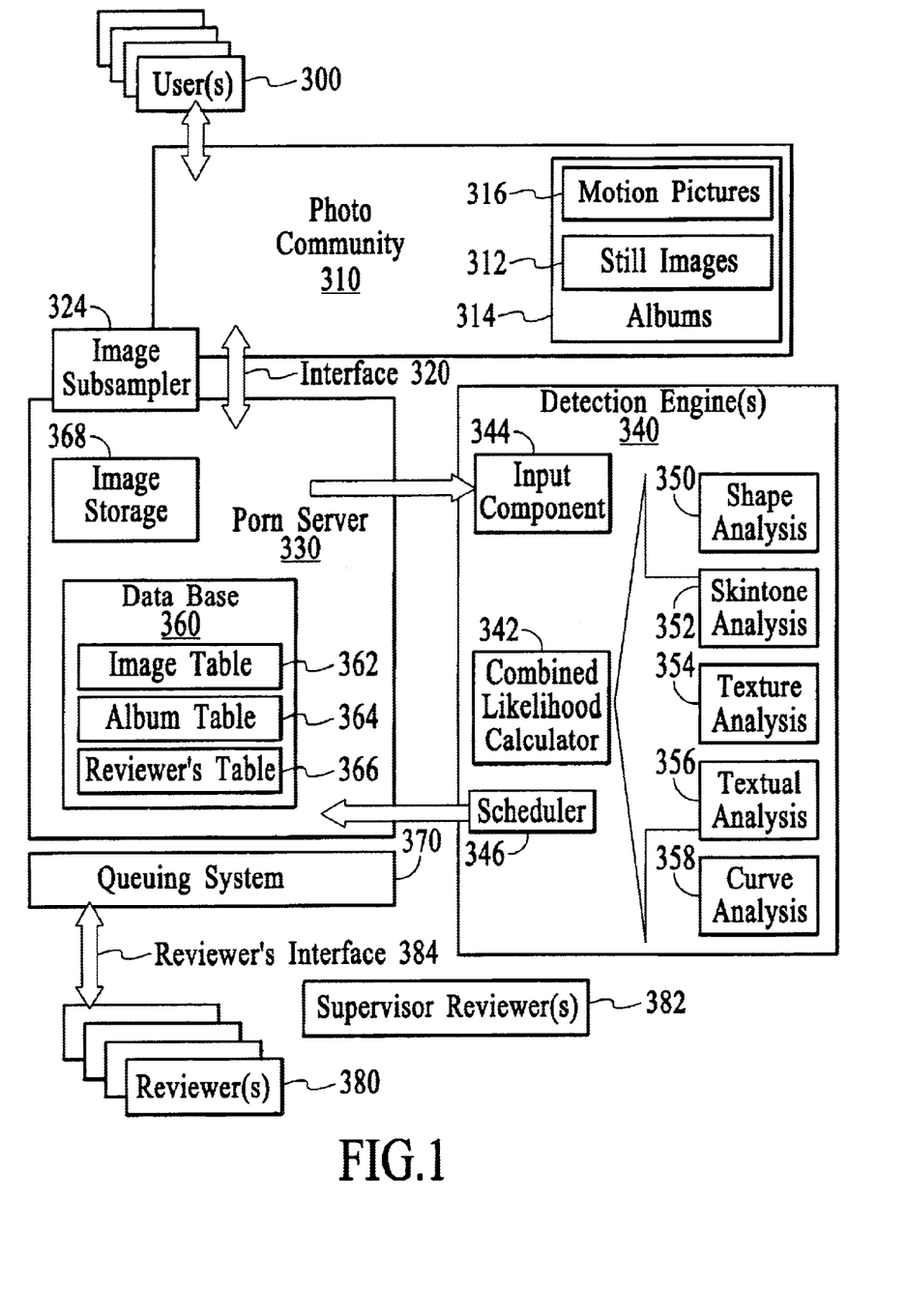
FIG. 1 is a schematic block diagram of the components in the workflow system.

In accordance with the present invention, FIG. 1 illustrates a schematic diagram of the workflow system components. The system includes end users 300, which subscribe to a photographic community 310, in particular, but not limited to an Internet based photo-sharing site. Images in such community 310 can be stored individually 312, in clusters or otherwise known as collections or albums 314, which can be physical or virtual. Images can be of different file formats and different nature, including and not limited to still images 312 (such as jpeg, GIF, TIF, Jpeg200 etc file formats), or digital movies 316 such as MPEG, AVI, and MP4 etc. A pornography detection server can be on a separate machine connected to the main site via a known Application Protocol Interface (API). The physical connection 320 can be via a local network, or via the Internet or Intranet. The Porn server 330 also has image detection engines 340 which again can be dedicated CPUs or part of a single configuration.

The engines 340 perform the analysis of the individual images. The engine itself includes scheduler 346 for controlling the retrieval and processing steps for the images, an input stack 344 which retrieves the images in the background, thus saving time and improving the efficiency of the system by eliminating communication and bandwidth delays for retrieval of the images. The engine has sub-engines 350,352,354,356 and 358 each performing a different analysis. The sub-engines include an engine to perform shape analysis of body parts 350, an engine to analyze skin tone 352, an engine to analyze texture of skin 354, an engine to analyze text that accompanies the image, such as title or description 356, and a curvature analysis 358. A likelihood-analyzer 342 receives all information from the sub-engines to create a single value of likelihood also referred to as combined likelihood that 113 the image is pornographic. The statistical likelihood may be expressed as a probability value which is a number expressing the likelihood that the image is of pornographic nature, expressed as the ratio of the number of actual occurrences to the number of possible occurrences. Alternatively, other statistical likelihood measures may be provided based on a variety known of statistical metrics.

All data about the images, including meta-data, which is additional data on the image provided by the site 310, and their classification and categorizations etc. are stored on a central database 360. The images themselves can be saved as a pointer to their storage location on the photo-community 310. Alternatively, the porn server 330 also includes a storage facility for the images 368 which can act as a temporary storage for the images. The images can be in full resolution as provided by the photo community 310. As an additional embodiment, images can be subsampled or reduced in size to an optimal size, which is small enough but still enable good detection of images. The subsampling engine 324 can perform subsampling as part of the transformation of the image from the photo-community 310 to the server 330. In case there are issues of bandwidth, the subsampler module 324 can be located on the photo-community side prior to sending the images to the server. In case there is no bandwidth issues such subsampling can be executed before the images are provided to the engines 340. The image storage component 368 can be for temporary storage of images as part of the review process, or alternatively this storage can be used as the long-term storage for the images as part of the long-term storage of the photo-community, depending on the architecture of the system at large.

The database 360 links to the stored images 368 as well as stores meta data information about the images. When images and meta data are stored in the database in block 360, the database stores them in two tables. The first table 362 is for the individual images, the second 364 is for a collection of images, i.e. albums. Each album points to individual image entries in the image table 362. A third table 366 includes information as to the reviewing process such as a reviewer's log in and password, statistics on each reviewer, priority of sorting images, rating system etc. A queuing system 370 determines the order of images and or albums to be reviewed by the reviewers 380. The reviewers may include a plurality of stations, which are linked to the queuing system 370 via an internal network or even directly through HTML pages on the Internet. Special reviewer 382 may be assign as a supervisor 382 which may determine the priorities, assign reviewers etc.

Figure 2:
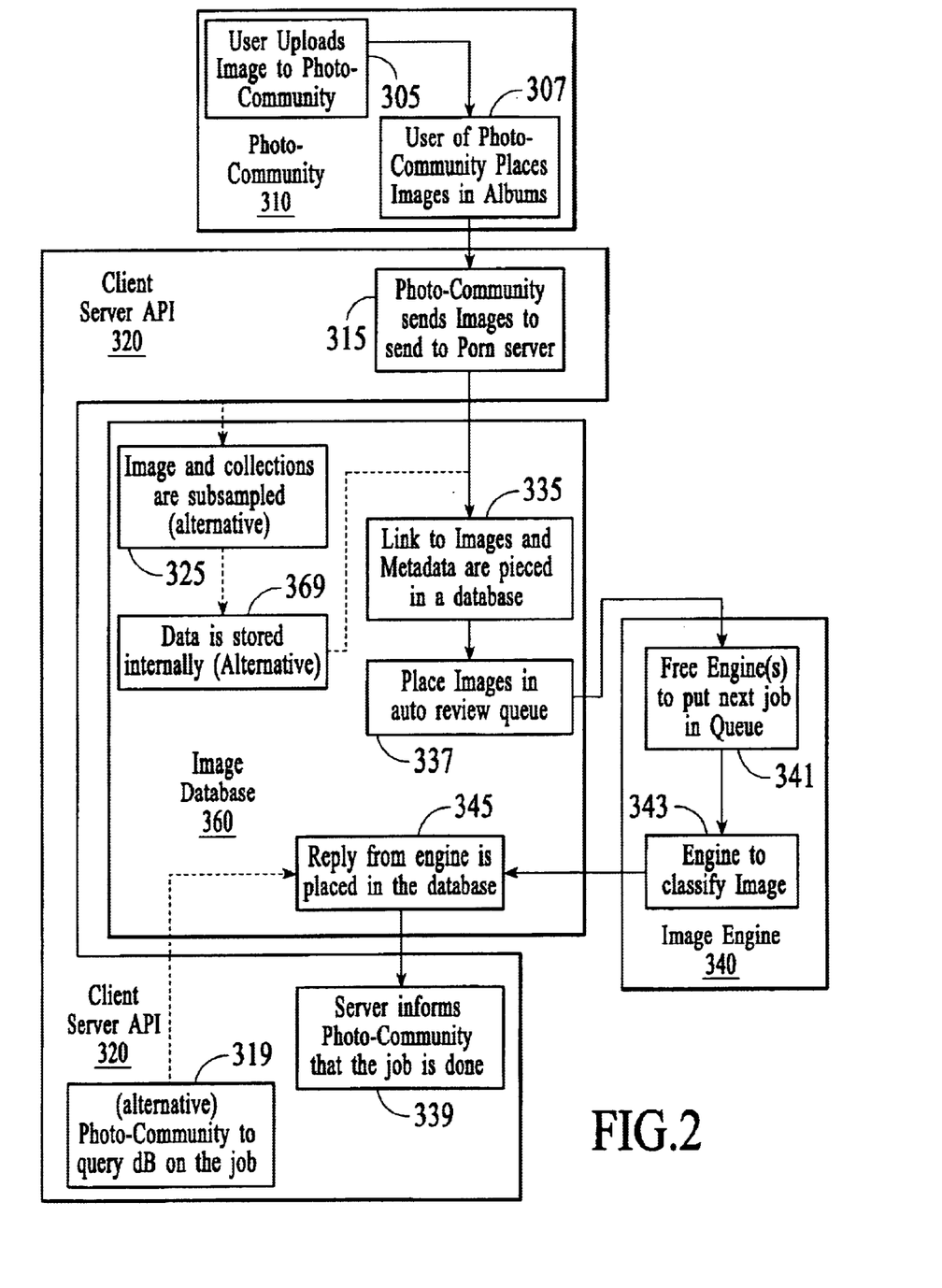
FIG. 2 shows a flow chart of the workflow.

Referring to the flow diagram of the image analysis workflow in FIG. 2, a user 300 uploads a single image or a collection of images 305 to the site 310. The images are stored 307 by the user individually 312 or as a collection 314 or motion pictures 316. Upon receiving a new batch of images, the photo-community server 310 sends a request 315 to the porn server 330. Such a request can be packaged as an XML request or any available communication command between applications. To eliminate redundancies of sending the same images multiple times, and to ensure unique classification of images, each image and each collection should include a unique image identification that both the photo-community 310 and the server 330 can refer to. The Porn-server 330 receives images and places 335 the images and associated information in the database 360. The information is placed in the two tables 362 for individual frames and 364 for collection of frames. In an additional embodiment, the server can also store the images 369 in its storage 368. Alternatively, only a link to the images can be stored in the database, while the images are still linked to their original storage location on the photo-site 310. An additional step can be a subsample of the images 325 before they are stored and processed. Such subsample can occur on the photo community 310 if bandwidth is an issue between the photo-community and the server, or as part of the transfer process 315. In the case of motion picture data, the subsampling process also means selecting key frames forming the movie clip. This is done once again to conserve bandwidth and later on unnecessary repeated calculations by the engine. Individual scenes in a movie are usually a repeat of previous frames with slight modifications, which depicts object movements or camera movements. Therefore, as part of the subsampling process, it is sufficient to only select key frames, one or a few from each scene. Alternatively, a movie collection can be sampled in equal or random frame intervals.

The images are placed in a queue 337 waiting to be processed by the engines 340. An engine, when free, pulls the queue 341 and if images are waiting, retrieves them and process them. A detailed description of the engine 340 functionality is provided in FIG. 3. An automatic reply is sent to the server and placed 345 in the associated tables for images and collections of images in the database 360 in the image table 362. Due to the pull nature of this system, many engines can work concurrently on the same database, thus creating a very scalable system. Due to the fact that the engines are in a separate thread, or even on a separate machine, the system can also be highly optimized for stress and load balance.

The automatic reply can be made available to the photo-site using the same protocol 320 that was utilized to place the images in the queue. Such a reply can be individual likelihood results for an image, or a collective likelihood for an album. The reply can be sent to the photo-community 339 as a job is finished. Alternatively, the photo-community can query regarding a specific image, or a collection as defined in step 319. Such a reply or query can include a list of most suspected images, or a sorted list by likelihood, wherein the most suspected images are provided up front. Alternatively, the results can be queried based on unique image identification.

Figure 3:
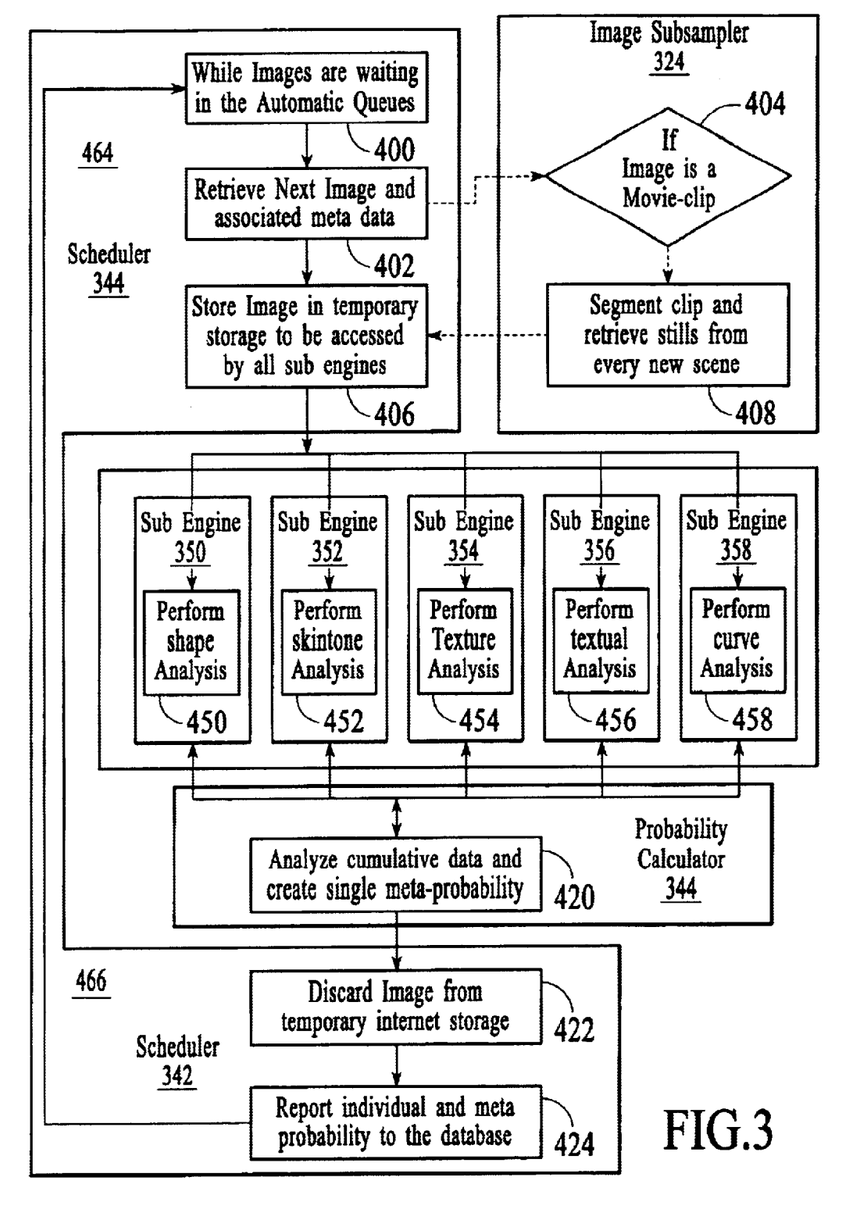
FIG. 3 describes the workflow of an individual analysis engine.

Referring to the flow diagram of the engine 340 as illustrated by FIG. 3, after being placed in the database, images and or collections of images are placed in a queue. It is the role of the engines, which can be one or many, to query the queue. The management and scheduling of the different analysis an image goes through is all controlled by the scheduler 346. The first task is to retrieve 402 the image and associated meta data from the server, and specifically from the database table 362 and the image storage 368. The Input process is separate from the actual analysis to allow multi processing. While one job is being analyzed, the next job is being retrieved 402 and placed 406 in a temporary storage of the engine. By doing so, the engine can be optimized for an optimal tradeoff between bandwidth to get the images and time to analyze them.

In the case of a movie clip, an additional step may occur wherein the movie clips are segmented and still frames are extracted, as described in step 325. The retrieved images are then sent by the scheduler to the individual analysis modules. Images are sent in step 450 to the shape analysis engine to detect indicative shapes associated with body parts. Independently, images are sent in step 452 to the skin tone analysis engine where human bodies are classified based on color attributes. Similarly, images are sent 454 to the Texture analysis engine where the picture is analyzed to identify bodies based on texture characteristics. Any textual meta data associated with an image and or collection, such as image names, comments etc. are sent 456 to the textual analysis engine, where suspicious words and sentences are being patterned and matched. The images are also sent 458 to a curvature analysis sub-engine 358 for possible matching with shapes based on curves.

Alternatively, each or some of the sub-engines may be concatenated. For example, the skin-tone sub engine may classify some regions. This information along with the image will be then sent to the curvature engine and the latter will examine only images marked by the former engine. Any combination and ordering may be executed by the scheduler to improve the accuracy and speed of the process. Additionally, other sub engines can be added to the process if deemed necessary. Such engines may be based on specific meta data that is provided by the site 310, or any improved detection technology. Such additions of new sub engines can be done transparently to the process workflow process and therefore the advantage of the system as defined.

The data from all sub engines is then analyzed 420 by the combined likelihood calculator 342. A single parameter is then generated to describe the overall probability that an image is of pornographic nature. The formulae for this calculation can be tweaked and optimized as the process matures. The individual probabilities along with the combined likelihood are then returned to the main database.

Figure 4:
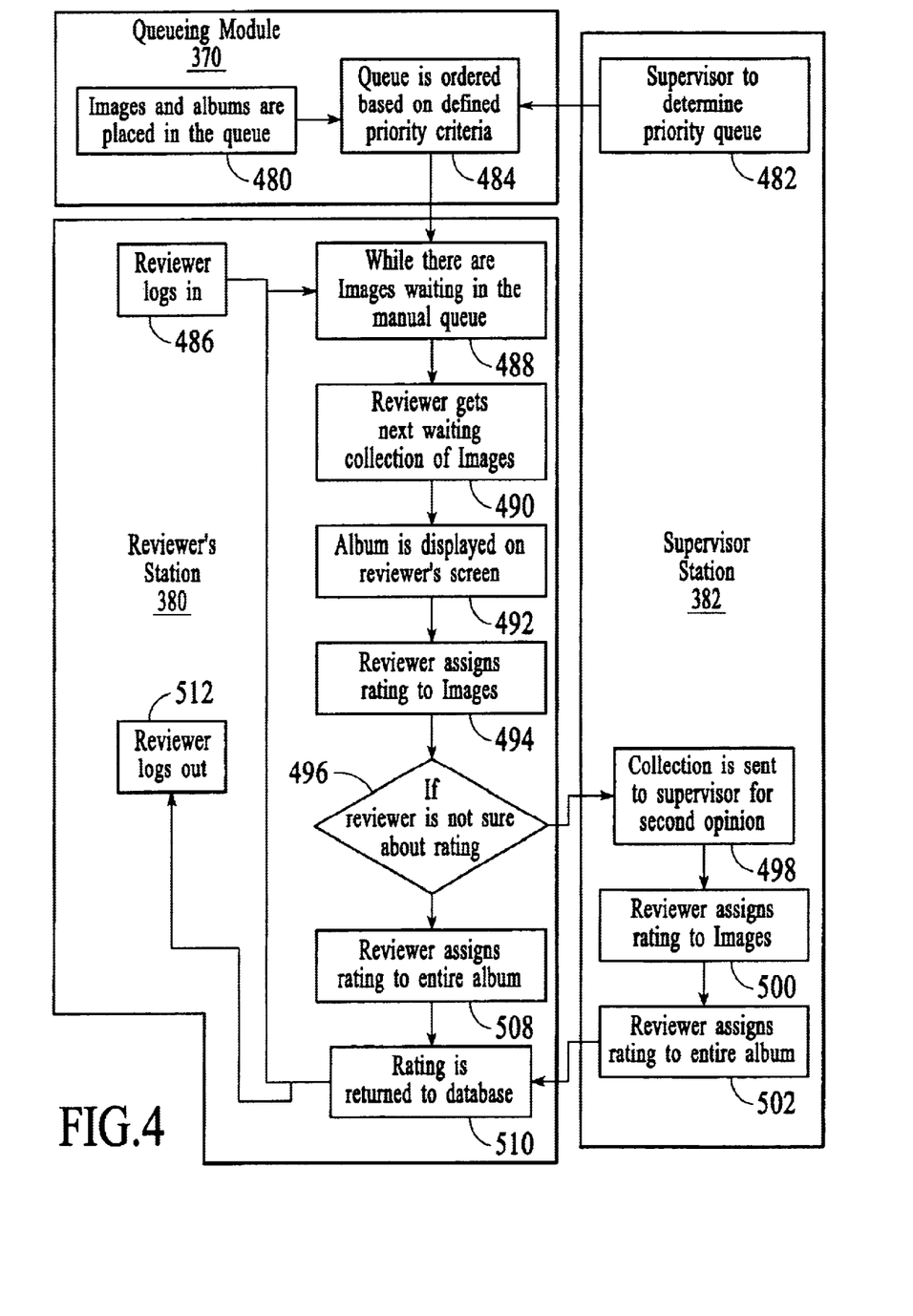
FIG. 4 illustrates the manual review workflow.
Figure 4A:
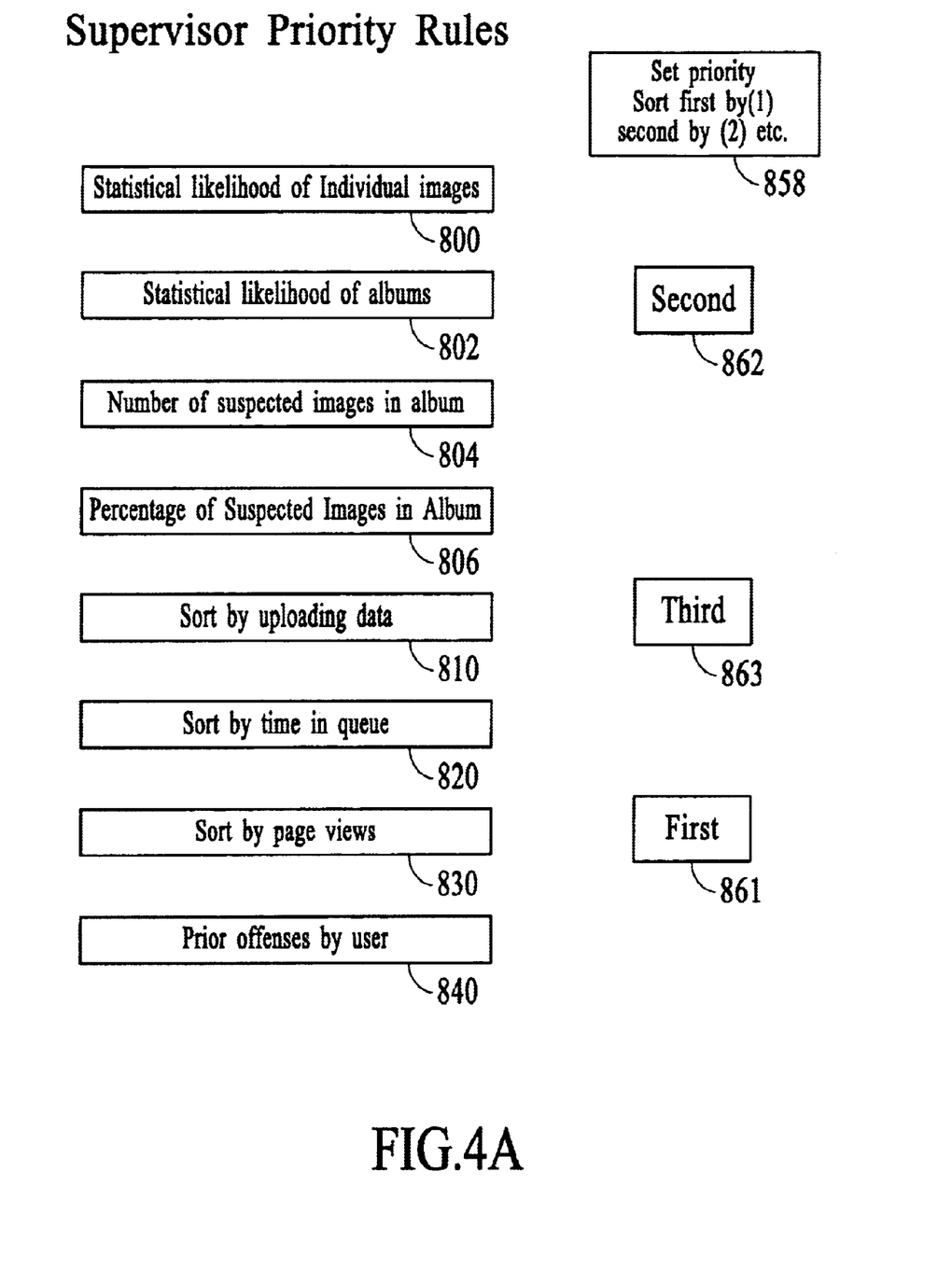
FIG. 4A illustrates the process of setting up priority criteria for the manual reviewing queue.

FIG. 4 shows an additional embodiment wherein images can be sent to a manual reviewing engine for a definitive classification. As a preparatory step, supervisor 382 can determine 482 some rules 385 as to the order that images should be reviewed. FIG. 4A. illustrates such priority list which can be modified by the supervisor. The supervisor may assign primary, secondary tertiary etc. criteria for sorting the queue based on different criteria. Such rules can be to review images based on the statistic likelihood of individual images 800, the collective likelihood of albums 802, percentage of images suspected 804, or the total number of images suspected 806 etc.

Other criteria can include additional information or meta data associated with the images such as the number of pageviews 820, which is the number of times an image was viewed, sorting by the date the image was uploaded 810, or the time the image was in the queue 812.

Other criteria may include meta data provided by the photo-community 310 such as prior offenses that a user may have 830, etc. In FIG. 4A as an illustrative example, the supervisor marked the first sorting criteria 861, to be pageviews 830, second sorting 862 to be the statistical likelihood 810 and the third criteria 863 to be the upload date and time 802.

Reviewers, which can be one or many, can login 486 and logout 512. While 488 images are still in the review queue 370, any free reviewing station pulls the next image or selection of images within in the queue. An album is being displayed 492 on the reviewer's screen as further illustrated in FIG. 5. The interface between the reviewing station and the database can be via some secure HTML communication or any Interface language such as XML. In such a manner, reviewers may log into the system remotely and out of the site's internal security system such as a firewall. With this architecture, multiple reviewers can be added as needed based on the load of the system and the productivity of the reviewers.

The reviewers can assign 494 classification of individual images or a collection. If a reviewer is not sure as to the rating of an image or a collection as defined in step 496, the images can be sent 498 for a second and deciding opinion by the supervisor. The supervisor will then repeat similar reviewing process as the reviewer did.

Upon assigning a rating, either by the reviewer or a supervisor, the data is returned 510 to the database 360. The results from the database can be sent to the photo community or asynchronously retrieved by the photo community upon request as described in FIG. 2 blocks 339 and 319 respectively.

Figure 6:
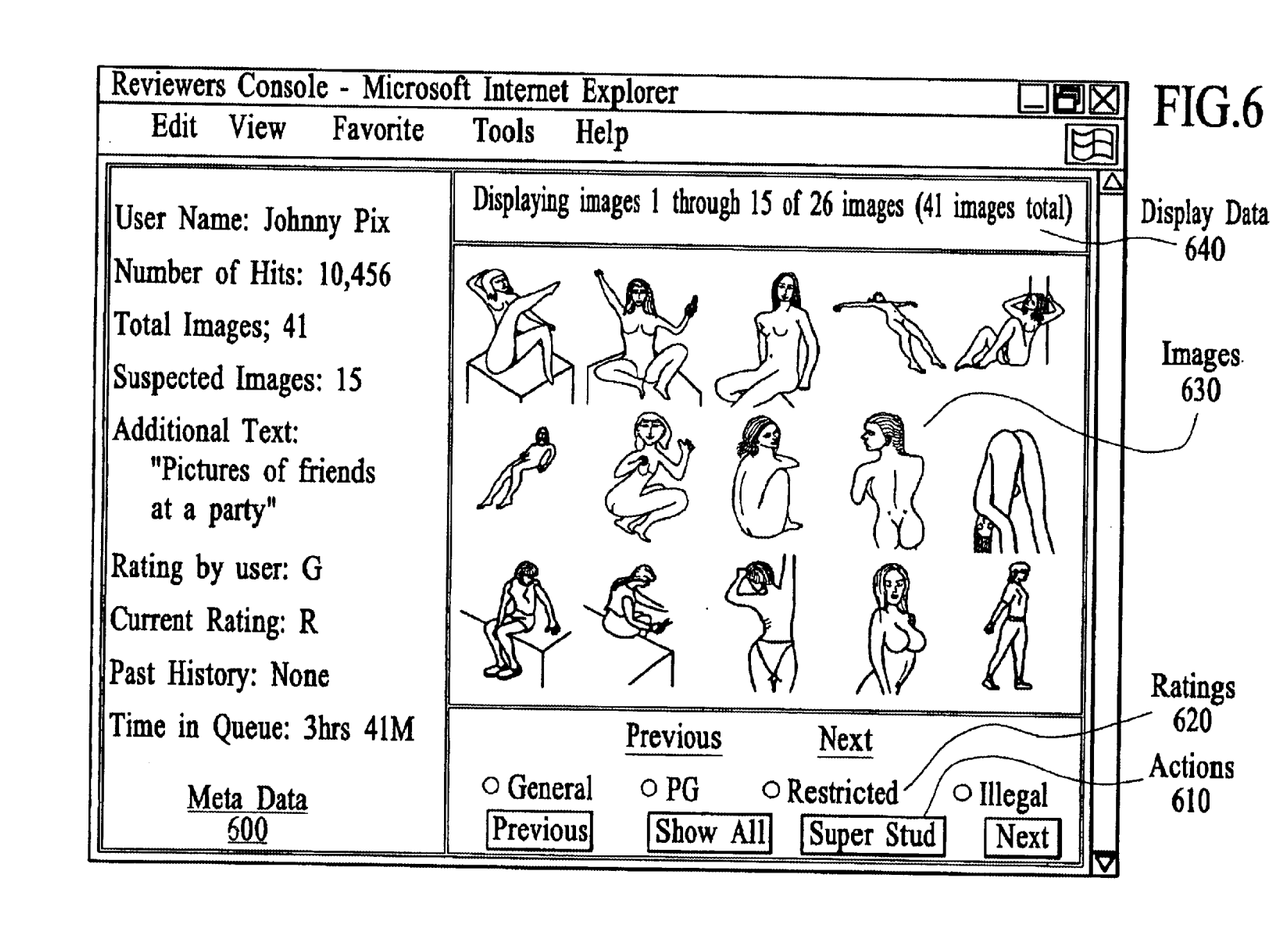
FIG. 6 illustrates the user interface look and feel of the reviewer's console.

FIG. 6 depicts an example of a potential user interface of the reviewer. The window in which a reviewer works can be HTML based. The information included includes an action window 610 wherein the reviewer can toggle between views, go to the next album or send albums to the supervisor when the reviewer is not sure as described in FIG. 4 block 498. The information also includes a text window 600 with the meta data that may help the reviewer in deciding as to the rating, such as the number of hits, which is also referred to as "page views", or otherwise number of people that looked at the images, additional text which alternatively can be highlighted or marked by the textual analysis engine 356, the ration between the total number and the suspected number of images etc. In terms of the user interface, any parameter that is beyond the acceptable normal can be marked differently, such as highlighted, marked in red etc. to immediately attract the reviewer's attention. Object 640 displays the pertinent information as to the current reviewed album. Block 630 displays the images themselves. The images may be displayed in reduced size, also termed as thumbnails, or as fill resolution. The reviewer may decide to view all images of the album or toggle to an alternative view where only the suspected images are displayed. This workflow will enable fast detection of suspected albums. The reviewer can then assign a rating, which can be redefined by the site. Different sites may have different needs, which vary by countries, and audience. One rating which is very important is the ability to mark images as illegal as illustrated in block 620. Illegal images include for example child pornography. Such albums are immediately moved up the queue and may be reported especially to the server 330 and to the client photo-community 310 for immediate action.

As alternative embodiments, due to the modular structure of the server, additional components can be easily added if needed. For example the detection engines may extend beyond pornographic detection and include a detection engine for copyrighted material. This is a useful tool to block images that have been unlawfully taken from other sources such as other webs sites and other publications. The reviewing system is identical to the one as explained in the main embodiments. All the difference is in the type of sub-engines used within the engine 340. FIG. 5A illustrates the components of the engine 740 as related to copyright material. Such a tool can be of great use for companies that are trying to protect their visual assets. Examples include celebrities, news agencies and image banks.

Referring to components of the imaging engine 740, which is the engine 340 modified to support copyright detection as illustrated by FIG. 5A, the sub-engines that will be used include a watermarking detection engine 751, a halftone pattern recognition engine 753, a textual analysis engine 755 and a graphical analysis engine 757. The textual analysis may also detect unique signatures that an image may have in its header or meta data which can link it to its original owner. The graphical analysis engine may detect known copyrighted or trademarked logos, signs or figures.

Figure 5:
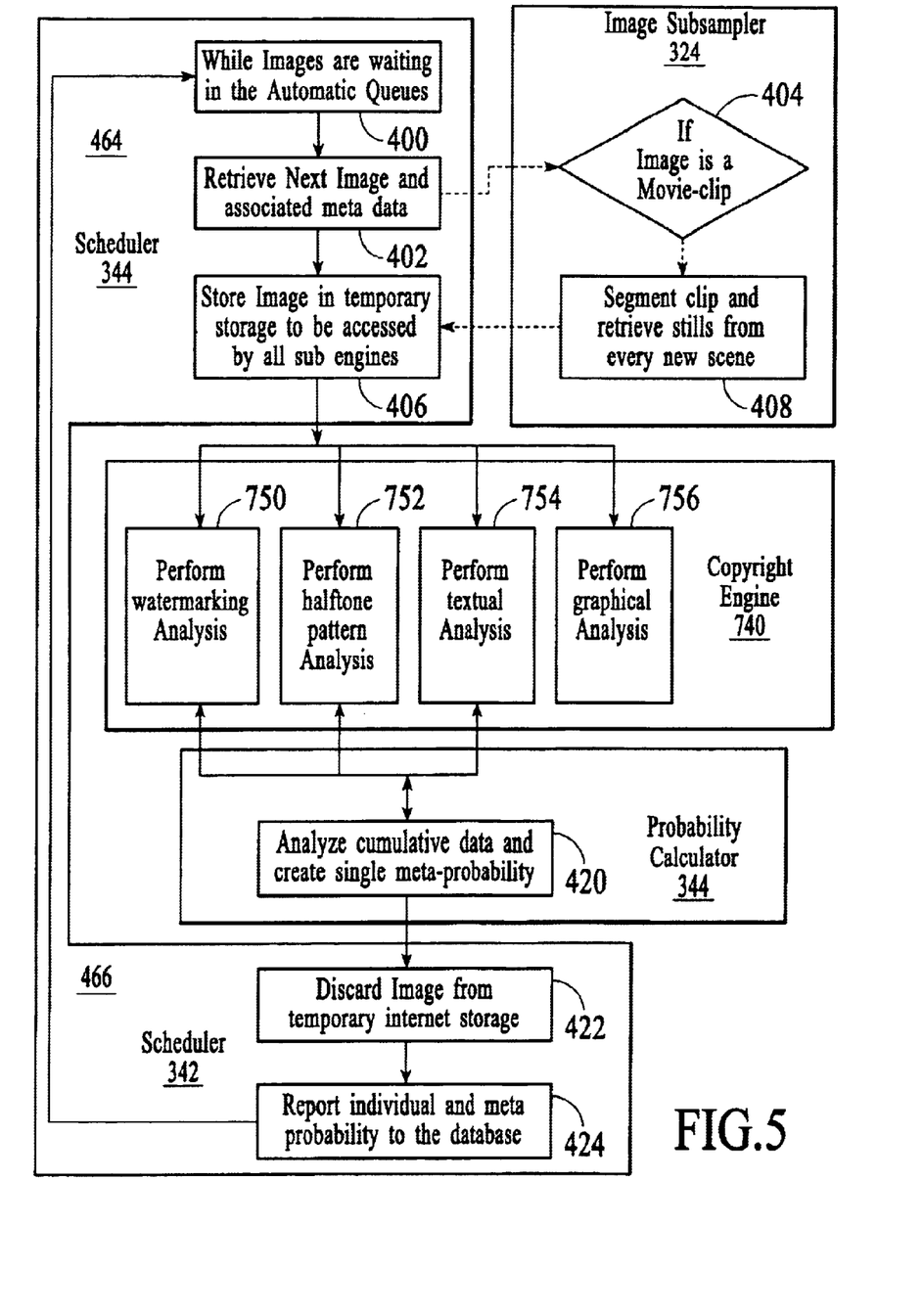
FIG. 5 illustrates the workflow for an alternative embodiment wherein the analysis engine is utilized to detect copyrighted material.
Figure 5A:
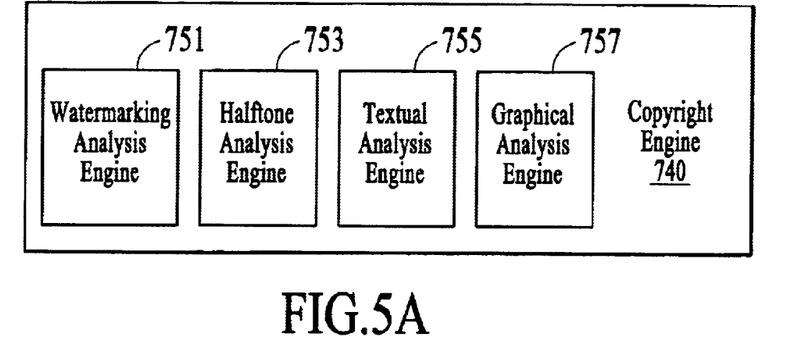
FIG. 5A illustrates the components of the imaging engine as related to copyright material.

Referring to workflow of the copyright violation detection system illustrated by FIG. 5, the images will pass through the sub engines described in FIG. 5A to detect if images include watermarking 750 in them; detect the possibility that images were unlawfully scanned from printed publications such as magazines 752, search for key words such as famous people, current events news etc. 754, and search for known graphical logos and symbols 756.

Of course, a hybrid system that can include both pornographic material and copyright violation material can be constructed by combining the pornographic detection engines 350, 352, 354, 356, and 358 with the copyright violation detection 751, 753 and 755.

Figure 5B:
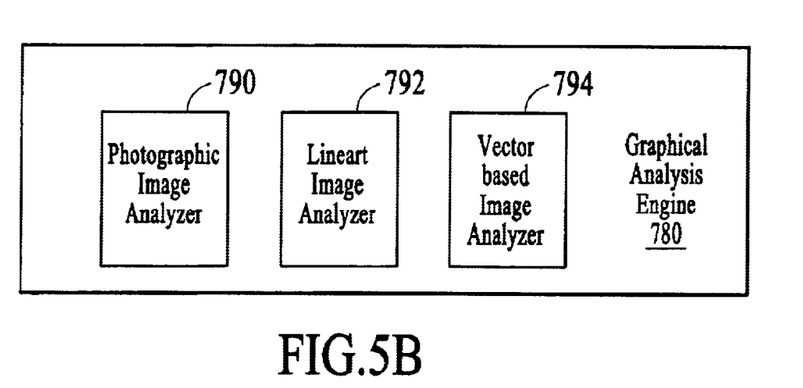
FIG. 5B illustrates the components of the imaging engine as related to offensive graphical material.

As further embodiments of the present invention, due to the modular structure of the server, additional detection engines may extend beyond pornographic detection and copyright violation detection to include a detection engine for graphically-offensive material. This is a useful tool to prevent for example hate-crime related material or offensive political propaganda material. As an example, such material may include the presence of the Swastika symbol in images, logos of supremacy organization etc. As described before, the reviewing system is identical to the one as explained in the main embodiments. All the difference is in the type of sub-engines used within the engine 340. FIG. 5B illustrates the components of the engine 840 as related to offensive graphical material.

Graphical images can be stored digitally in various ways. In particular, they can be of photographic pixel representation, which is a grid based representation of image, artificial line-art representation such as drawings of art objects and vector representation which is a mathematical formulae to represent separate shapes such as lines, polygons and text, and groups of such objects, as opposed to bitmaps.

Referring to components of the imaging engine 840, which is the engine 340 modified to support detection of offensive material as illustrated by FIG. 5B, the sub-engines that will be used include a line-art analyzer 790, a pixel analyzer 792 and a vector analyzer 794.

In conclusion, the reader may see that the workflow solution as described in the present invention can be used to increase productivity and improve the detection capability of imaging based reviewing systems. Specifically, such a system can ensure the absence of pornographic material on community based web sites.

In addition to the increased throughput of the automated system, the present invention also describes a manual workflow stage in which reviewers can efficiently review images and classify them. Furthermore, due to the modular structure of this architecture, new detection components can be added without the need to redesign or affect the workflow and or the interface of this system. Furthermore, such server-based image reviewing solution can be utilized for other purposes involving inappropriate use of images, such as the detection of copyrighted material.

Although the description above contains many specificities, these should not be construed as limiting the scope of the invention but as merely providing illustrations of some of the presently preferred embodiments of this invention. Various other embodiments and ramifications will be apparent and possible within it's scope for those skilled in the art. Thus the scope of the invention should be determined by the appended claims and their legal equivalents as covering all such alterations and modifications that fall within the true scope and spirit of the invention, rather than by the examples given.

What is claimed is:

1. A server based system for classification of images suspected as pornographic comprising:
   (a) a first defined interface between a client application and said server for transferring images and related meta data;
   (b) a database for storing and queuing the images and meta data associated with said image;
   (c) independent engine apparatus for automatically analyzing the images using a plurality of independent review engines for a plurality of criteria for analyzing results from said plurality of independent review engines of said images into a single parameter representing a likelihood value that an image is of pornographic nature; and
   (d) a second defined interface to convey a result of said analyzing to said client application, said result including a list of most suspected images.

2. A server based system for classification of images suspected as pornographic as recited in claim 1 wherein said automatic analyzing eliminates a majority of said images and is performed using color analysis on skin tone.

3. A server based system for classification of images suspected as pornographic as recited in claim 1 wherein said automatic analyzing eliminates a majority of said images and is performed using a shape analysis.

4. A server based system for classification of images suspected as pornographic as recited in claim 1 wherein said automatic analyzing eliminates a majority of said images and is performed by means of a curvature analysis.

5. A server based system for classification of images suspected as pornographic as recited in claim 1 wherein said automatic analyzing eliminates a majority of said images and is performed by texture analysis.

6. A server based system for classification of images suspected as pornographic as recited in claim 1 wherein said automatic analyzing eliminates a majority of said images and is performed by means of body pose and posture analysis.

7. A server based system for classification of images suspected as pornographic as recited in claim 1 wherein said automatic analyzing eliminates a majority of said images and is performed by means of a combination of color analysis on skin tone, shape analysis, curvature analysis, texture analysis, body pose and posture analysis.

8. A server based system for classification of images suspected as pornographic as recited in claim 1 wherein said images are clustered as a collection and said analyzing is performed on said cluster.

9. A server-based system for classification of images suspected as pornographic as recited in claim 8 wherein said analyzing of said cluster includes determining a collective likelihood of the cluster based on combined statistical estimation of individual images in the cluster.

10. A server-based system for classification of images suspected as pornographic as recited in claim 8 wherein said cluster is a continuous collection of individual frames, which creates a single motion-picture clip.

11. A server based system for classification of images suspected as pornographic as recited in claim 10 wherein a selection of said individual frames from said cluster for said classification is determined by automatic detection of a change of scene in said motion picture clip.

12. A server based system for classification of images suspected as pornographic as recited in claim 10 wherein a selection of said individual frames from said cluster for said classification is determined by a predefined interval of said individual frames.

13. A server-based system for classification of images suspected as pornographic as recited in claim 8 wherein said cluster is a continuous collection of motion-picture clip.

14. A server based system for classification of images suspected as pornographic as recited in claim 1 further comprising:
   (a) a first apparatus for performing an additional automated step to eliminate a majority of said images that are positively non-pornographic based on said likelihood value;
   and (b) a second apparatus for performing a manual review performed by human reviewers to determine whether said most suspected images are pornographic.

15. A server based system for classification of images suspected as pornographic as recited in claim 14 further comprising an apparatus for creating a queue of said most suspected images for said manual review based on a priority criteria.

16. A server based system for classification of images suspected as pornographic as recited in claim 15 wherein said priority criteria is a number of page views requested for the image.

17. A serve based system for classification of images suspected as pornographic as recited in claim 15 wherein said priority criteria is a statistical likelihood of a said image being pornographic.

18. A server based system for classification of images suspected as pornographic as recited in claim 14 wherein said reviewers assign a rating to each image.

19. A server based system for classification of images suspected as pornographic as recited in claim 14 wherein said reviewers assign a rating to a cluster of images.

20. A server based system for classification of images suspected as pornographic as recited in claim 14 wherein said reviewers are supervised by a supervisor.

21. A server-based system for classification of images suspected as pornographic as recited in claim 20 wherein said reviewers can escalate images that they are uncertain of to said supervisor for determining if said images that said reviewers are uncertain of are pornographic.

22. A server-based system for classification of images suspected as pornographic as recited in claim 14 further comprising apparatus for creating a queue of a collection of images based on a priority criteria.

23. A server based system for classification of images suspected as pornographic as recited in claim 22 wherein said priority criteria is the percent of said suspected images in said collection of images.

24. A server based system for classification of images suspected as pornographic as recited in claim 22 wherein said priority criteria is the total number of said suspected images within said collection of images.

25. A server based system for classification of images suspected as pornographic as recited in claim 1 wherein said images are sub sampled to the smallest image size available which maintains sufficient data for said classification thus saving on transmission time memory and bandwidth.

26. A server based system for classification of images suspected as pornographic as recited in claim 1 wherein said client application is run on a remote computer, said images suspected as pornographic obtained from a data storage subsystem of said computer, and said system further comprising:

(a) a first apparatus for performing an additional automated step to eliminate most images that are positively non-pornographic based on said likelihood value thus maintaining only small numbers of suspected images from said analyzing;

(b) a second apparatus for submitting images for a manual review step performed by a human reviewer to determine whether said suspected images from said automated step are pornographic; and (c) a third apparatus for performing a clean-up step to allow the deletion of the objectionable pornographic images from said remote computer.

27. A server based system for classification of copyrighted images comprising:

(a) a first-defined interface between a client application and a server to transfer images and related meta data;

(b) a database to store and queue the images and said related meta data;

(c) independent engine apparatus to automatically analyze the images using a plurality of criteria related to copyright material;

(d) apparatus for analyzing the individual reviews into a single parameter representing a likelihood value that an image is copyrighted;

and (e) a second-defined interface for conveying a result to said client application.

28. A server based system for classification of copyrighted images as recited in claim 27 wherein said criteria include watermarking.

29. A server based system for classification of copyrighted images as recited in claim 27 wherein said copyright criteria include an existence of printed half tone patterns.

30. A server based system for classification of copyrighted images as recited in claim 27 wherein said copyright criteria include an existence of textual phrases that depict celebrity images.

31. A server based system for classification of copyrighted images as recited in claim 27 wherein said copyright criteria include an existence of textual phrases that depict current events.

32. A server based system for classification of copyrighted images as recited in claim 27 wherein said copyright criteria include a binary original of a copyright image.

33. A server based system for detection of graphically-offensive material in images comprising:

(a) a first-defined interface between a client application and a server to transfer images and related meta data;

(b) a database to store and queue the images and said related meta data;

(c) independent engine apparatus to automatically analyze the images using a plurality of criteria related to said graphically offensive material;

(d) apparatus for analyzing the individual reviews into a single parameter representing a likelihood value that an image includes said graphically-offensive material;

and (e) a second-defined interface for conveying a result to said client application.

34. A server based system for detection of graphically-offensive material in images as recited in claim 33 wherein said criteria include the detection of known logos associated with politically adverse organizations.

35. A server based system for detection of graphically-offensive material in images as recited in claim 33 wherein said criteria include the detection of known logos associated with hate crimes.

36. A server based system for detection of graphically-offensive material in images as recited in claim 33 wherein said images include line art representation.

37. A server based system for detection of graphically-offensive material in images as recited in claim 33 wherein said images include vector representation.

38. A server based system for detection of graphically-offensive material in images as recited in claim 33 wherein said images include pixel representation.

\* \* \* \* \*

UNITED STATES PATENT AND TRADEMARK OFFICE
CERTIFICATE OF CORRECTION

| | | |
|---|---|---|
| PATENT NO. | : 6,904,168 B1 | Page 1 of 1 |
| APPLICATION NO. | : 10/040901 | |
| DATED | : June 7, 2005 | |
| INVENTOR(S) | : Eran Steinberg | |

It is certified that error appears in the above-identified patent and that said Letters Patent is hereby corrected as shown below:

Column 11, line 13, the word "serve" should read --server--

Signed and Sealed this

Eighteenth Day of November, 2008

JON W. DUDAS
*Director of the United States Patent and Trademark Office*